(12) United States Patent
Korkus et al.

(10) Patent No.: US 9,904,685 B2
(45) Date of Patent: *Feb. 27, 2018

(54) ENTERPRISE LEVEL DATA MANAGEMENT

(75) Inventors: Ohad Korkus, Herzeliya (IL); Yakov Faitelson, Elkana (IL); Ophir Kretzer-Katzir, Reut (IL); David Bass, Carmei Yoseph (IL)

(73) Assignee: VARONIS SYSTEMS, INC., New York, NY (US)

( * ) Notice: Subject to any disclaimer, the term of this patent is extended or adjusted under 35 U.S.C. 154(b) by 262 days.

This patent is subject to a terminal disclaimer.

(21) Appl. No.: 12/673,691

(22) PCT Filed: Jan. 27, 2010

(86) PCT No.: PCT/IL2010/000069
§ 371 (c)(1),
(2), (4) Date: May 19, 2010

(87) PCT Pub. No.: WO2011/030324
PCT Pub. Date: Mar. 17, 2011

(65) Prior Publication Data
US 2012/0221550 A1 Aug. 30, 2012

Related U.S. Application Data

(60) Provisional application No. 61/240,726, filed on Sep. 9, 2009.

(51) Int. Cl.
*G06F 17/30* (2006.01)
*G06F 21/62* (2013.01)
*H04L 29/06* (2006.01)

(52) U.S. Cl.
CPC .... *G06F 17/30091* (2013.01); *G06F 21/6218* (2013.01); *H04L 63/10* (2013.01);
(Continued)

(58) Field of Classification Search
CPC ............ G06F 17/30091; G06F 21/6218
(Continued)

(56) References Cited

U.S. PATENT DOCUMENTS 5,465,387 A 11/1995 Mukherjee
5,889,952 A 3/1999 Hunnicutt et al.
(Continued)

FOREIGN PATENT DOCUMENTS

CN 1588889 A 3/2005
CN 191603 A 2/2007
(Continued)

OTHER PUBLICATIONS

An International Search Report and a Written Opinion both dated May 23, 2011 which issued during the prosecution of Applicant's PCT/IL11/00065.
(Continued)

*Primary Examiner* — Cam-Y Truong
(74) *Attorney, Agent, or Firm* — Ladas & Parry LLP

(57) ABSTRACT

A system for identifying data of interest from among a multiplicity of data elements residing on multiple platforms in an enterprise, the system including background data characterization functionality characterizing the data of interest at least by at least one content characteristic thereof and at least one access metric thereof, the at least one access metric being selected from data access permissions and actual data access history and near real time data matching functionality selecting the data of interest by considering only data elements which have the at least one content characteristic thereof and the at least one access metric thereof from among the multiplicity of data elements.

5 Claims, 5 Drawing Sheets

(52) U.S. Cl.
CPC ............... *G06F 2221/2101* (2013.01); *G06F 2221/2141* (2013.01)

(58) Field of Classification Search
USPC ...................................................... 707/722
See application file for complete search history.

(56) References Cited

U.S. PATENT DOCUMENTS

| | | | |
|---|---|---|---|
| 5,899,991 | A | 5/1999 | Karch |
| 5,941,947 | A * | 8/1999 | Brown ............... G06F 21/6218 709/225 |
| 6,308,173 | B1 | 10/2001 | Glasser et al. |
| 6,338,082 | B1 | 1/2002 | Schneider |
| 6,393,468 | B1 | 5/2002 | McGee |
| 6,675,161 | B1 * | 1/2004 | Suchter ............ G06F 17/30873 |
| 6,772,350 | B1 | 8/2004 | Belani et al. |
| 6,928,439 | B2 | 8/2005 | Satoh |
| 7,031,984 | B2 | 4/2006 | Kawamura et al. |
| 7,068,592 | B1 | 6/2006 | Duvaut et al. |
| 7,124,272 | B1 | 10/2006 | Kennedy et al. |
| 7,401,087 | B2 | 7/2008 | Copperman et al. |
| 7,403,925 | B2 | 7/2008 | Schlesinger et al. |
| 7,421,740 | B2 | 9/2008 | Fey et al. |
| 7,478,035 | B1 | 1/2009 | Wrench et al. |
| 7,529,748 | B2 | 5/2009 | Wen et al. |
| 7,555,482 | B2 | 6/2009 | Korkus |
| 7,606,801 | B2 | 10/2009 | Faitelson et al. |
| 7,716,240 | B2 | 5/2010 | Lim |
| 7,720,858 | B2 | 5/2010 | Dettinger et al. |
| 7,882,098 | B2 | 2/2011 | Prahlad et al. |
| 8,166,071 | B1 * | 4/2012 | Korablev et al. ............. 707/783 |
| 8,250,048 | B2 | 8/2012 | Yalamanchi et al. |
| 8,285,748 | B2 | 10/2012 | Thomas et al. |
| 8,296,255 | B1 * | 10/2012 | Wawda ........................ 706/48 |
| 8,306,999 | B2 | 11/2012 | Gass, III et al. |
| 2003/0023476 | A1 * | 1/2003 | Gainey ............ G06Q 10/06398 705/7.42 |
| 2003/0048301 | A1 | 3/2003 | Menninger |
| 2003/0051026 | A1 | 3/2003 | Carter et al. |
| 2003/0231207 | A1 | 12/2003 | Huang |
| 2004/0030915 | A1 | 2/2004 | Sameshima et al. |
| 2004/0186809 | A1 | 9/2004 | Schlesinger et al. |
| 2004/0249847 | A1 | 12/2004 | Wang et al. |
| 2004/0254919 | A1 | 12/2004 | Giuseppini |
| 2004/0267729 | A1 * | 12/2004 | Swaminathan et al. .......... 707/3 |
| 2005/0065823 | A1 | 3/2005 | Ramraj et al. |
| 2005/0086529 | A1 | 4/2005 | Buchsbaum |
| 2005/0108206 | A1 | 5/2005 | Lam et al. |
| 2005/0120054 | A1 | 6/2005 | Shulman et al. |
| 2005/0203881 | A1 | 9/2005 | Sakamoto et al. |
| 2005/0240457 | A1 * | 10/2005 | Connally ............... G06Q 10/06 705/321 |
| 2005/0246762 | A1 | 11/2005 | Girouard et al. |
| 2005/0278334 | A1 | 12/2005 | Fey et al. |
| 2006/0064313 | A1 | 3/2006 | Steinbarth et al. |
| 2006/0085788 | A1 | 4/2006 | Amir et al. |
| 2006/0184459 | A1 | 8/2006 | Parida |
| 2006/0184530 | A1 | 8/2006 | Song et al. |
| 2006/0277184 | A1 | 12/2006 | Faitelson et al. |
| 2007/0011091 | A1 | 1/2007 | Smith |
| 2007/0033340 | A1 | 2/2007 | Tulskie et al. |
| 2007/0061487 | A1 | 3/2007 | Moore et al. |
| 2007/0073698 | A1 | 3/2007 | Kanayama et al. |
| 2007/0112743 | A1 | 5/2007 | Giampaolo et al. |
| 2007/0156693 | A1 | 7/2007 | Soin et al. |
| 2007/0198608 | A1 | 8/2007 | Prahlad et al. |
| 2007/0203872 | A1 | 8/2007 | Flinn et al. |
| 2007/0244899 | A1 | 10/2007 | Faitelson et al. |
| 2007/0266006 | A1 | 11/2007 | Buss |
| 2007/0276823 | A1 | 11/2007 | Borden et al. |
| 2007/0282855 | A1 | 12/2007 | Chen et al. |
| 2008/0126172 | A1 * | 5/2008 | Melamed ............... G06Q 10/00 705/7.21 |
| 2008/0162707 | A1 | 7/2008 | Beck et al. |
| 2008/0172720 | A1 | 7/2008 | Botz et al. |
| 2008/0183680 | A1 | 7/2008 | Meynier et al. |
| 2008/0209535 | A1 | 8/2008 | Athey |
| 2008/0256619 | A1 | 10/2008 | Neystadt |
| 2008/0271157 | A1 | 10/2008 | Faitelson et al. |
| 2009/0043775 | A1 * | 2/2009 | Cotner ............... G06F 21/6227 |
| 2009/0100058 | A1 | 4/2009 | Faitelson et al. |
| 2009/0119298 | A1 * | 5/2009 | Faitelson et al. ................ 707/9 |
| 2009/0150981 | A1 | 6/2009 | Amies et al. |
| 2009/0157570 | A1 | 6/2009 | Pall et al. |
| 2009/0182715 | A1 * | 7/2009 | Falkenberg ...................... 707/3 |
| 2009/0265780 | A1 | 10/2009 | Korkus et al. |
| 2009/0320088 | A1 | 12/2009 | Gill et al. |
| 2010/0023523 | A1 * | 1/2010 | Chung et al. ..................... 707/9 |
| 2010/0100524 | A1 | 4/2010 | Bae et al. |
| 2010/0174731 | A1 | 7/2010 | Vermeulen et al. |
| 2010/0185650 | A1 | 7/2010 | Topatan et al. |
| 2010/0257456 | A1 | 10/2010 | Lieb et al. |
| 2010/0299763 | A1 | 11/2010 | Marcus et al. |
| 2010/0319067 | A1 * | 12/2010 | Mohanty et al. ............... 726/21 |
| 2011/0047466 | A1 | 2/2011 | Michelman |

FOREIGN PATENT DOCUMENTS

| | | |
|---|---|---|
| CN | 101283357 A | 10/2008 |
| CN | 101692228 | 4/2010 |
| CN | 1906613 | 10/2010 |
| WO | 2011/148376 A2 | 12/2011 |
| WO | 2011/148377 A1 | 12/2011 |

OTHER PUBLICATIONS

An International Search Report and a Written Opinion both dated Jun. 14, 2011 which issued during the prosecution of Applicant's PCT/IL11/00066.

An International Search Report and a Written Opinion both dated May 24, 2011 which issued during the prosecution of Applicant's PCT/IL11/00077.

USPTO OA dated Dec. 14, 2010 in connection with U.S. Appl. No. 11/789,884.

USPTO OA dated Dec. 14, 2010 in connection with U.S. Appl. No. 11/786,522.

Sahadeb De, et al; "Secure Access Control in a Multi-user Geodatabase", available on the internet at: URL http://www10.giscafe.com.2005.

Sara C. Madeira, et al; "Biclustering Algorithms for Biological Data Analysis: A Survey", Mar. 2004; http://www.cs.princeton.edu/courses/archive/spr05/cos598E/bib/bicluster.pdf.

Sara C. Madeira; "Clustering, Fuzzy Clustering and Biclustering: An Overview", p. 31-53, Jun. 27, 2003.

S.R. Kleiman; Vnodes: An Architecture for Multiple File System Types in Sun UNIX, USENIX Association: Summer Conference Proceedings, Atlanta 1986, pp. 1-10.

Findutils; GNU Project-Free Software Foundation (FSF), 3 pages, Nov. 2006.

GENUNIX; "Writing Filesystems—VFS and Vnode interfaces", 5 pages, Oct. 2007.

The International Search Report and Written Opinion of the International Searching Authority dated May 20, 2010 issued during prosecution of Applicants PCT/IL10/00069.

USPTO OA dated Aug. 1, 2008 in connection with U.S. Appl. No. 11/258,256.

USPTO OA dated Oct. 31, 2008 in connection with U.S. Appl. No. 11/635,736.

USPTO OA dated Feb. 12, 2008 in connection with U.S. Appl. No. 11/258,256.

USPTO OA dated Jul. 9, 2010 in connection with U.S. Appl. No. 11/789,884.

USPTO NFOA dated Sep. 14, 2012 in connection with U.S. Appl. No. 12/861,967.

International Search Report and Written Opinion dated Oct. 1, 2012 issued during prosecution of PCT/IL2012/000240.

An Office Action dated Jul. 5, 2012, which issued during the prosecution of U.S. Appl. No. 12/772,450.

(56) References Cited

OTHER PUBLICATIONS

An International Preliminary Report on Patentability dated Jul. 31, 2012, which issued during the prosecution of Applicant's PCT/IL2011/00066.
An International Preliminary Report on Patentability dated Jul. 31, 2012, which issued during the prosecution of Applicant's PCT/IL2011/00065.
USPTO FOA dated Jul. 2, 2013 in connection with U.S. Appl. No. 13/413,748.
Notice of Allowance dated Jul. 12, 2013, which issued during the prosecution of U.S. Appl. No. 12/814,807.
An English translation of an Office Action dated Jun. 3, 2014 which issued during the prosecution of Chinese Patent Application No. 201080046731.
USPTO NFOA dated Jan. 16, 2013 in connection with U.S. Appl. No. 13/413,748.
An Office Action dated Oct. 31, 2016, which issued during the prosecution of U.S. Appl. No. 13/413,748.
First Chinese Office Action dated Jul. 4, 2016: Appln, No. 2012800711553 (In English).
An Office Action dated Mar. 4, 2013, which issued during the prosecution of U.S. Appl. No. 12/814,807.
An Office Action dated Feb. 14, 2013, which issued during the prosecution of U.S. Appl. No. 13/014,762.
An Office Action dated Mar. 25, 2013, which issued during the prosecution of U.S. Appl. No. 13/303,826.
An Office Action dated Mar. 24, 2015, which issued during the prosecution of U.S. Appl. No. 13/413,748.
An Office Action dated Mar. 1, 2017 which issued during the prosecution of Chinese Patent Application No. 2012800711553.
USPTO FOA dated Nov. 18, 2014 in connection with U.S. Appl. No. 13/384,459.
Extended European Search Report dated Nov. 26, 2015; Appln. No. 12870552.2-1951/2823408 PCT/IL2012000240.
An Office Action dated Aug. 17, 2017. which issued during the prosecution of U.S. Appl. No. 13/413,748.

* cited by examiner

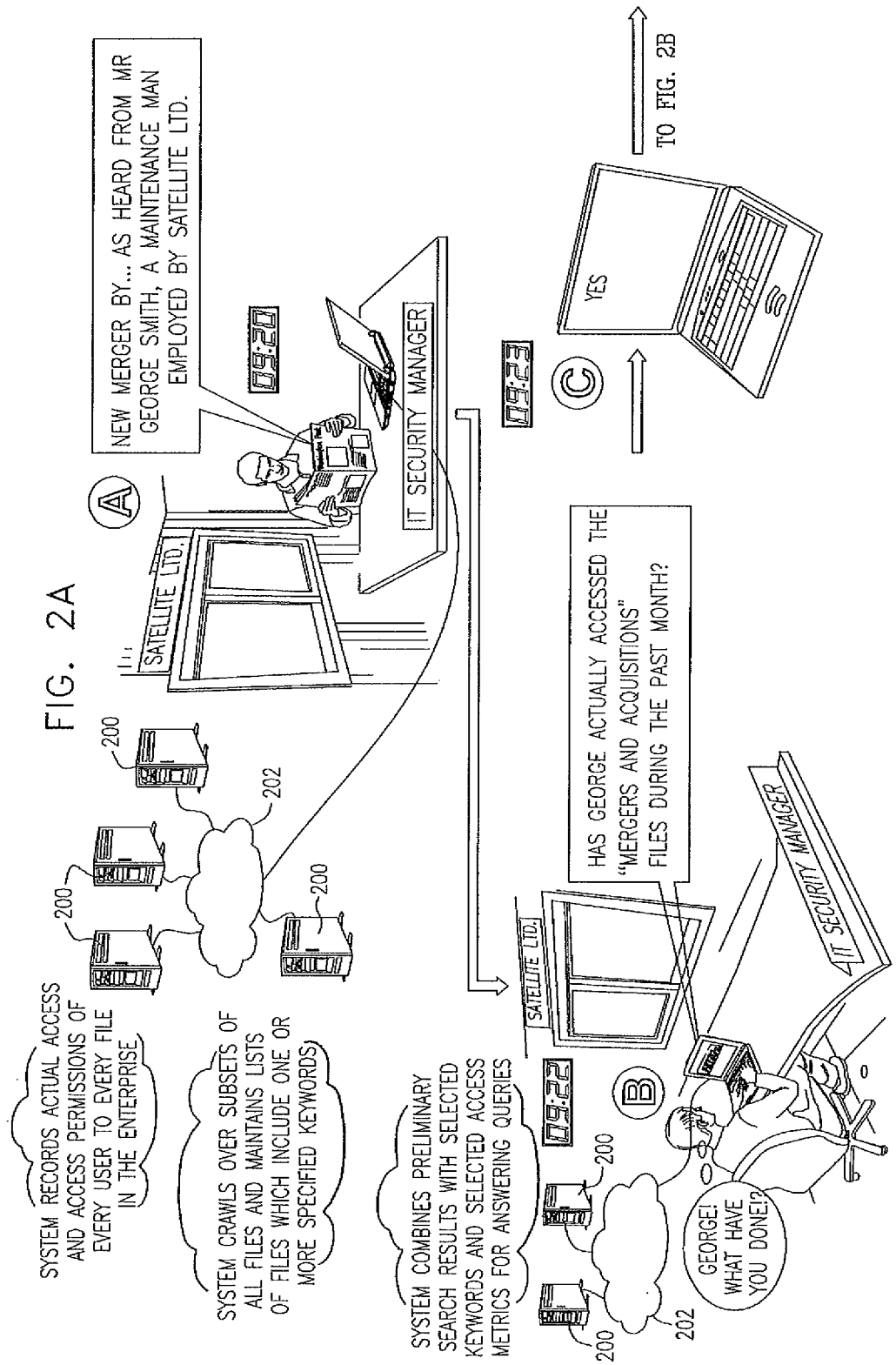

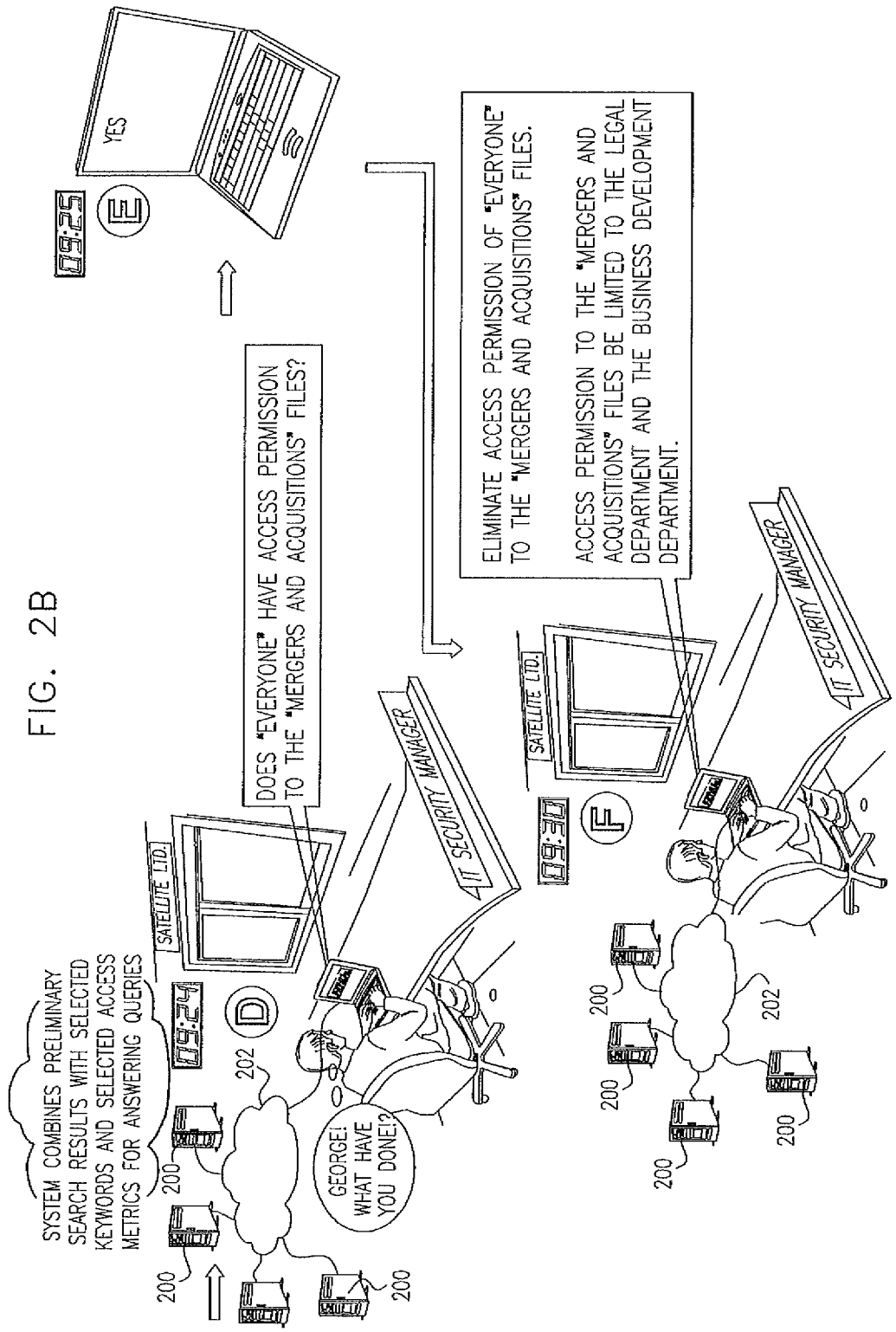

ENTERPRISE LEVEL DATA MANAGEMENT

REFERENCE TO RELATED APPLICATIONS

Reference is made to U.S. Provisional Patent Application Ser. No. 61/240,726, filed Sep. 9, 2009 and entitled USE OF ACCESS METRIC IN LARGE SCALE DATA MANIPULATION, the disclosure of which is hereby incorporated by reference and priority of which is hereby claimed pursuant to 37 CFR 1.78(a) (4) and (5)(i).

Reference is also made to the following patents and patent applications, owned by assignee, the disclosures of which are hereby incorporated by reference, which are believed to relate to subject matter similar to the subject matter of the present application:

U.S. Pat. Nos. 7,555,482 and 7,606,801;

U.S. Published Patent Application Nos. 2007/0244899, 2008/0271157, 2009/0100058, 2009/0265780 and 2009/0119298; and U.S. patent application Ser. No. 12/498,675.

FIELD OF THE INVENTION

The present invention relates to data management generally and more particularly enterprise level data management.

BACKGROUND OF THE INVENTION

The following patent publications and articles are believed to represent the current state of the art:

U.S. Pat. Nos. 7,031,984; 6,338,082; 6,928,439; 7,555,482; 7,606,801; 6,393,468; 5,899,991; 7,068,592 and 5,465,387.

U.S. Published Patent Application Nos.: 2003/0051026; 2004/0249847; 2004/0186809; 2005/0108206; 2005/0278334; 2005/0203881; 2005/0120054; 2005/0086529; 2006/0064313; 2006/0184530; 2006/0277184; 2006/0184459 and 2007/0203872.

SUMMARY OF THE INVENTION

The present invention provides improved systems and methodologies for data management.

There is thus provided in accordance with a preferred embodiment of the present invention a system for identifying data of interest from among a multiplicity of data elements residing on multiple platforms in an enterprise, the system including background data characterization functionality characterizing the data of interest at least by at least one content characteristic thereof and at least one access metric thereof, the at least one access metric being selected from data access permissions and actual data access history and near real time data matching functionality selecting the data of interest by considering only data elements which have the at least one content characteristic thereof and the at least one access metric thereof from among the multiplicity of data elements.

Preferably, the near real time data matching functionality includes background field of search definition and searching functionality operative to define a field of search in accordance with the at least one access metric and to search within the field of search based on the at least one content characteristic.

In accordance with a preferred embodiment of the present invention the near real time data matching functionality includes background field of search definition and searching functionality operative to define a field of search in accordance with the at least one access metric multiple times and to search within the field of search multiple times, wherein the at least one access metric is different at least some of the multiple times.

Preferably, the at least one access metric is a dynamic metric which changes over time during operation of the enterprise.

In accordance with a preferred embodiment of the present invention the system also includes automatic field of search redefinition and search functionality operative to redefine the field of search in accordance with the at least one access metric multiple times and search within the field of search multiple times, wherein the at least one access metric is different at least some of the multiple times. Additionally, the automatic field of search redefinition and search functionality is operative to search only within those portions of the field of search that have been modified or added as the result of redefining the field of search in accordance with changes in the at least one access metric. Alternatively or additionally, the system also includes data element status monitoring functionality, noting the current status of data elements that have been modified, added or removed in accordance with changes in the at least one access metric.

Preferably, the searching is prioritized at least in accordance with at least one access metric related prioritization characteristic. Additionally, results of the searching are ordered at least in accordance with at least one access metric related prioritization characteristic.

In accordance with a preferred embodiment of the present invention the near real time data matching functionality includes searching functionality for searching for data elements which have the at least one content characteristic thereof and identification functionality operative separately from the searching for data elements which have the at least one content characteristic thereof, identifying data elements from among the multiplicity of data elements in accordance with the at least one access metric and combining functionality, combining results of the searching and the identifying. Additionally, the searching and the identifying are performed by separate entities.

There is also provided in accordance with another preferred embodiment of the present invention a method for identifying data of interest from among a multiplicity of data elements residing on multiple platforms in an enterprise, the method including characterizing the data of interest at least by at least one content characteristic thereof and at least one access metric thereof, the at least one access metric being selected from data access permissions and actual data access history and selecting the data of interest by considering only data elements which have the at least one content characteristic thereof and the at least one access metric thereof from among the multiplicity of data elements.

Preferably, the considering includes defining a field of search in accordance with the at least one access metric and searching within the field of search based on the at least one content characteristic.

In accordance with a preferred embodiment of the present invention the considering includes defining a field of search in accordance with the at least one access metric multiple times and searching within the field of search multiple times, wherein the at least one access metric is different at least some of the multiple times.

Preferably, the at least one access metric is a dynamic metric which changes over time during operation of the enterprise.

In accordance with a preferred embodiment of the present invention the method also includes automatically redefining the field of search in accordance with the at least one access metric multiple times and searching within the field of search multiple times, wherein the at least one access metric is different at least some of the multiple times. Additionally, the searching includes searching only within those portions of the field of search that have been modified or added as the result of redefining the field of search in accordance with changes in the at least one access metric. Alternatively or additionally, the method also includes noting the current status of data elements that have been modified, added or removed in accordance with changes in the at least one access metric.

In accordance with a preferred embodiment of the present invention the searching is prioritized at least in accordance with at least one access metric related prioritization characteristic. Additionally, results of the searching are ordered at least in accordance with at least one access metric related prioritization characteristic.

Preferably, the selecting the data of interest by considering only data elements which have the at least one content characteristic thereof and the at least one access metric thereof from among the multiplicity of data elements includes searching for data elements which have the at least one content characteristic thereof, separately from the searching for data elements which have the at least one content characteristic thereof, identifying data elements from among the multiplicity of data elements in accordance with the at least one access metric and combining results of the searching and the identifying. Additionally, the searching and the identifying are performed by separate entities.

BRIEF DESCRIPTION OF THE DRAWINGS

The present invention will be understood and appreciated more fully from the following detailed description, taken in conjunction with the drawings in which:

FIG. 2 is a simplified pictorial illustration of another example of operation of the system and methodology of the present invention;

DETAILED DESCRIPTION OF A PREFERRED EMBODIMENT

Figure 1:
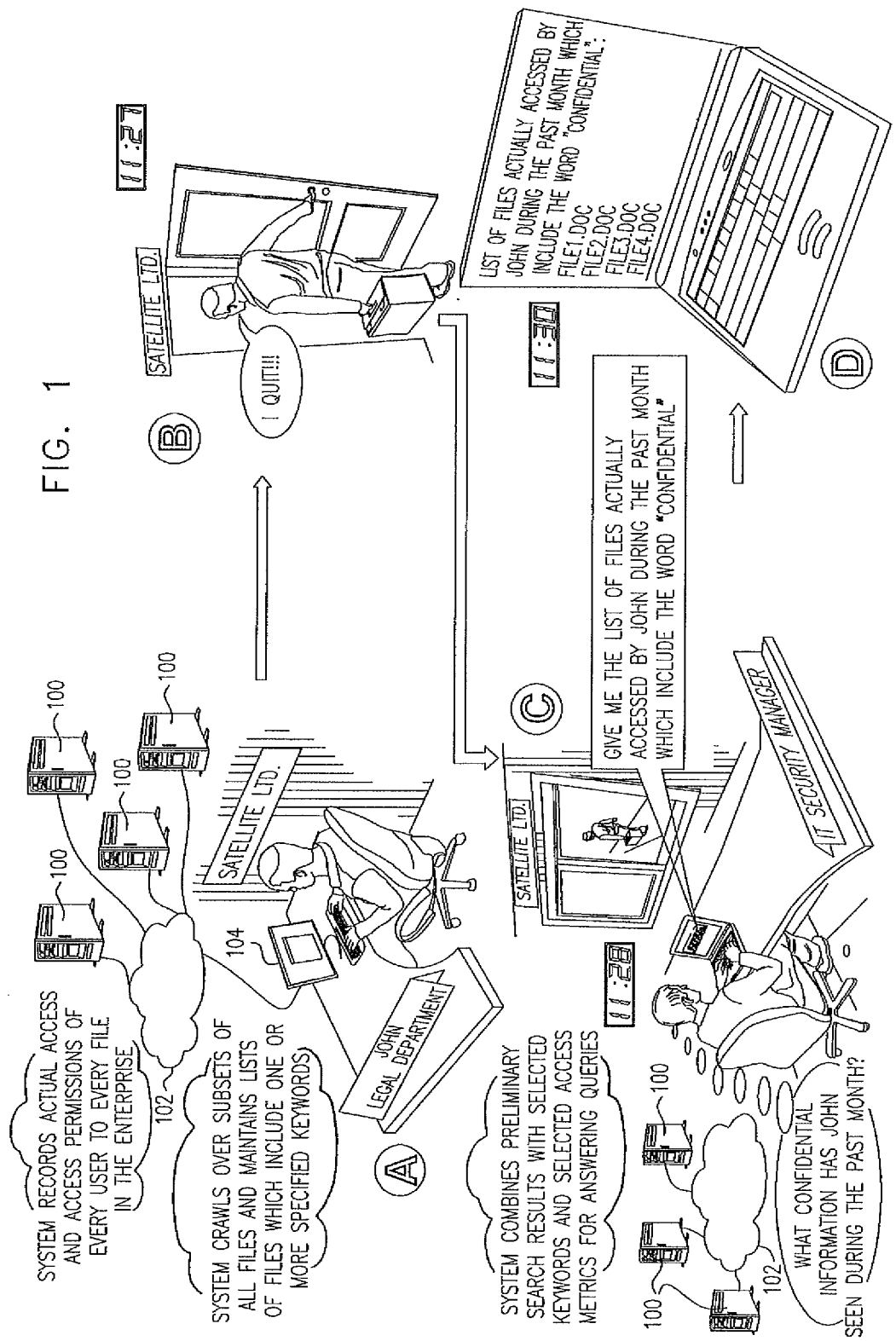
FIG. 1 is a simplified pictorial illustration of one example of operation of the system and methodology of the present invention.

Reference is now made to FIG. 1, which is a simplified pictorial illustration of one example of operation of the system and methodology of the present invention. As seen in FIG. 1, there is provided a system and method for identifying data of interest from among a multiplicity of data elements residing on multiple platforms in an enterprise.

Two essential functions are performed:
characterizing the data of interest at least by at least one content characteristic thereof and at least one access metric thereof, the at least one access metric being selected from data access permissions and actual data access history; and selecting the data of interest by considering only data elements which have the at least one content characteristic thereof and the at least one access metric thereof from among the multiplicity of data elements.

In the example of FIG. 1, an enterprise typically has multiple servers 100 which may be located in disparate locations and are connected by a network 102. The network is typically connected to many clients, of which client 104, a computer which is used by a user named John, is an example. The servers 100 typically contain many files, which are typically numbered in the thousands, hundreds of thousands or millions. John typically has access permissions to some but not all of the files of the enterprise and in any given period, such as a week, month or year, actually accesses some but not all of the files of the enterprise for which he has access permission.

As illustrated pictorially at stage A in FIG. 1, the system and methodology of the present invention operates in the background to record actual access and access permissions of every user to every file in the enterprise. It is appreciated that the scope of activities of the system and methodology of the present invention may be restricted to exclude certain users and certain files.

The system and methodology of the present invention also operates in the background to crawl over subsets of all files in the enterprise and to maintain lists of files which include one or more specified item such as a text or non-text item, a string and one or more specified keywords.

Preferably, subsets of all files are selected in accordance with access permission metrics. For example, for personnel having access permission to legal department files, the subset for crawling is the legal department files.

The specified text item or items may be selected by a manager as being appropriate for each subset. Thus, for example for the subject of legal department files, keywords such as "confidential" "lawsuit" and "judgment" may be appropriate. In other contexts, strings of various types, such as sequences of numbers or non-textual characters, may be employed. The set of items may be updated from time to time by an authorized manager.

Returning to the example of FIG. 1, it is seen that at stage B, John abruptly terminates his employment at the enterprise. In accordance with company policy, as seen at stage C, the IT Security Manager immediately queries the system to indicate what files marked "Confidential" John had actually accessed during the month previous to termination of his employment. The IT Security Manager receives a response to his query in near real time, typically within a minute.

It is a particular feature of the present invention that due to the background operation of the system and methodology of the present invention whereby the history of actual access of every user to every file in the enterprise is recorded and lists of files which include specified items are maintained, the query of the IT Security Manager can be responded to in near real time. The system and methodology of the present invention achieves this near real time response by combining currently available actual access and access permissions information with preliminary search result information.

Reference is now made to FIGS. 2A and 2B, which is a simplified pictorial illustration of another example of operation of the system and methodology of the present invention. As seen in FIGS. 2A and 2B, there is provided a system and method for identifying data of interest from among a multiplicity of data elements residing on multiple platforms in an enterprise. The same two essential functions described hereinabove with reference to FIG. 1 are performed by the system and functionality of the present invention.

As in the example of FIG. 1, an enterprise typically has multiple servers 200 which may be located in disparate locations and are connected by a network 202. The network is typically connected to many clients. The servers 200 typically contain many files, which are typically numbered in the thousands, hundreds of thousands or millions.

As illustrated pictorially at stage A in FIG. 2A, similarly to FIG. 1, the system and methodology of the present invention operates in the background to record actual access and access permissions of every user to every file in the enterprise. It is appreciated that the scope of activities of the system and methodology of the present invention may be restricted to exclude certain users and certain files.

The system and methodology of the present invention also operates in the background to crawl over subsets of all files in the enterprise and to maintain lists of files which include one or more specified items.

Preferably, subsets of all files are selected in accordance with access permission metrics. For example, for personnel having access permission to legal department files, the subset for crawling is the legal department files.

The specified items may be selected by a manager as being appropriate for each subset. Thus, for example for the subject of legal department files, keywords such as "merger" "acquisition" and "buyout" may be appropriate. The set of keywords may be updated from time to time by an authorized manager.

Returning to the example of FIGS. 2A and 2B, it is seen that at stage A in FIG. 2A, an IT Security Manager becomes aware of a leak of company information to the press. The IT Security Manager queries the system as follows:

1. Did the person to whom the leak is attributed actually access the computer files relating to mergers and acquisitions?

2. Are the computer files relating to mergers and acquisitions available to "everyone" in the enterprise?

The IT Security Manager receives a response to his query in near real time, typically within a minute.

It is a particular feature of the present invention that due to the background operation of the system and methodology of the present invention whereby the history of actual access and access permissions of every user to every file in the enterprise is recorded and lists of files which include specified items are maintained, the query of the IT Security Manager can be responded to in near real time. The system and methodology of the present invention achieves this near real time response by combining currently available actual access and access permissions information with preliminary search result information.

On the basis of the response to his queries, the IT Security Manager immediately orders elimination of the access permission of "everyone" to the merger and acquisition files and orders that the access permission to the mergers and acquisitions files be henceforth limited to the legal department and the business development department.

Figure 3:
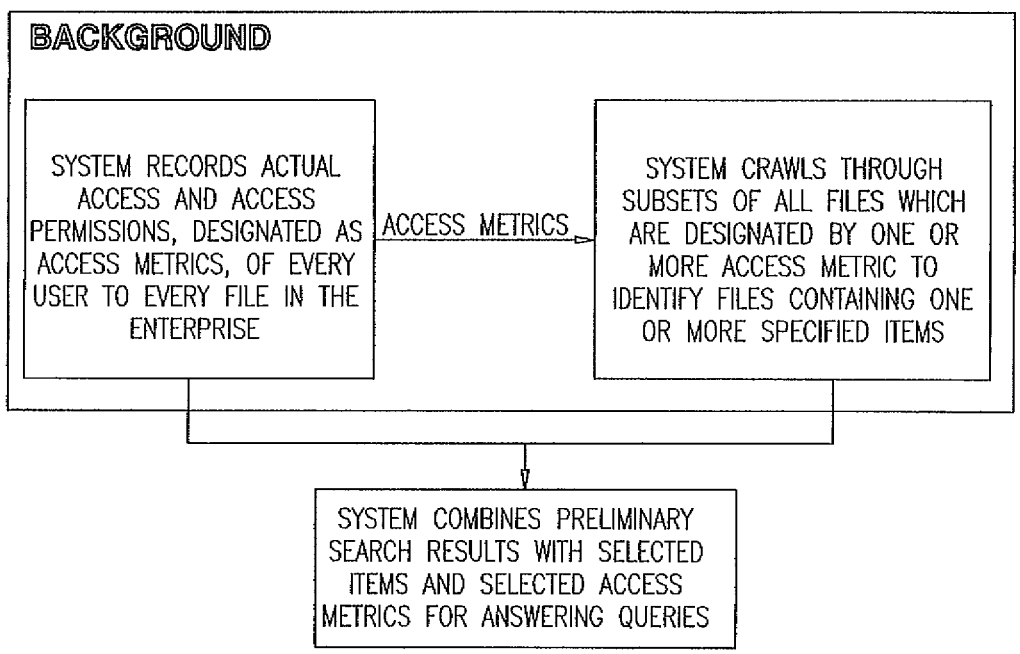
FIG. 3 is a simplified block diagram illustration of the system and methodology of the present invention.

Reference is now made to FIG. 3, which is a simplified block diagram illustration of the system and methodology of the present invention. As seen in FIG. 3 and described hereinabove in FIGS. 1 and 2 with reference to two specific examples, the system and methodology of the present invention includes the following functionality which takes place in the background:

Actual access of every user to every file in the enterprise is recorded and stored in a database. Access permissions of every user to every file in the enterprise are recorded and stored in a database. This functionality is embodied in a system, commercially available under the trademark DatAdvantage by an affiliate of the assignee of the present invention, Varonis Systems Inc. of New York, N.Y. and is described in U.S. Pat. No. 7,606,801 and in U.S. Published Patent Application 2009/0265780 of the present assignee, the disclosures of which are hereby incorporated by reference. Access permissions and/or actual access are together designated as access metrics and may be used to designate subsets of all of the files in the enterprise.

Crawling through files which are designated by one or more access metrics to identify files containing one or more specified items.

Upon receipt of a query, which could include a request for a report, the system combines information relating to actual access and/or access permissions with preliminary search result information, such as that provided by the crawling functionality described hereinabove, to provide a response which indicates which files which meet criteria established by access metrics specified in the query include items specified in the query.

Figure 4:
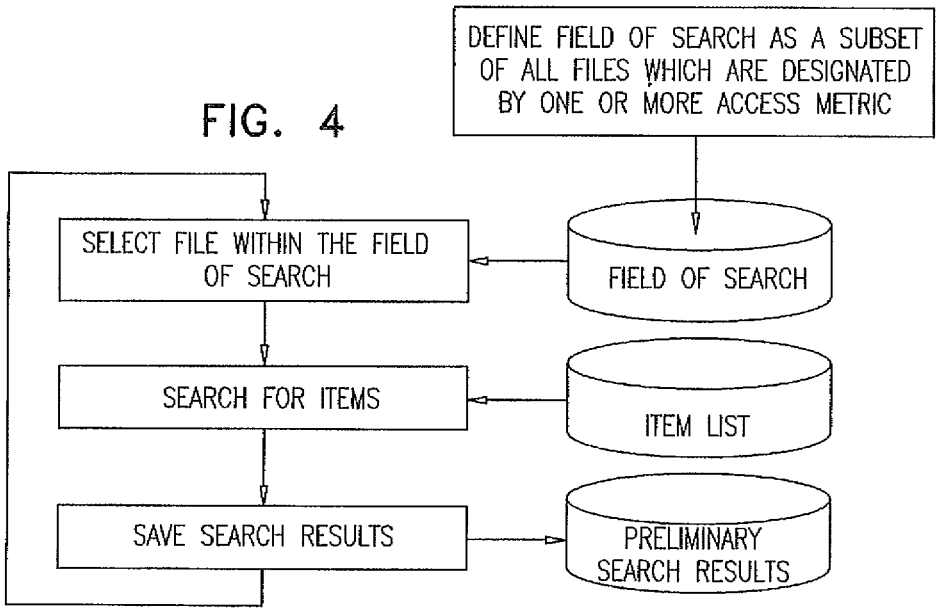
FIG. 4 is a simplified block diagram illustration of functionality for background characterization of data at least by at least one content characteristic thereof and at least one access metric thereof, useful in the system and methodology of FIG. 3.

Reference is now made to FIG. 4, which is a simplified block diagram illustration of crawling functionality for background characterization of data at least by at least one content characteristic thereof and at least one access metric thereof, useful in the system and methodology of FIG. 3.

The crawling functionality of FIG. 4 includes an initial step of defining a field of search for crawling in accordance with one or more access metric. The access metric is defined by one or both of access permissions and actual access and may change over time. For example the field of search may be: all files to which personnel of the legal department have access permission and have been accessed at least once within the last one year.

The system examines each file in the defined field of search for the presence of at least one item from among a collection of items stored in a item list database. Identification of files containing at least one item in the collection is stored in a preliminary search results database.

Figure 5:
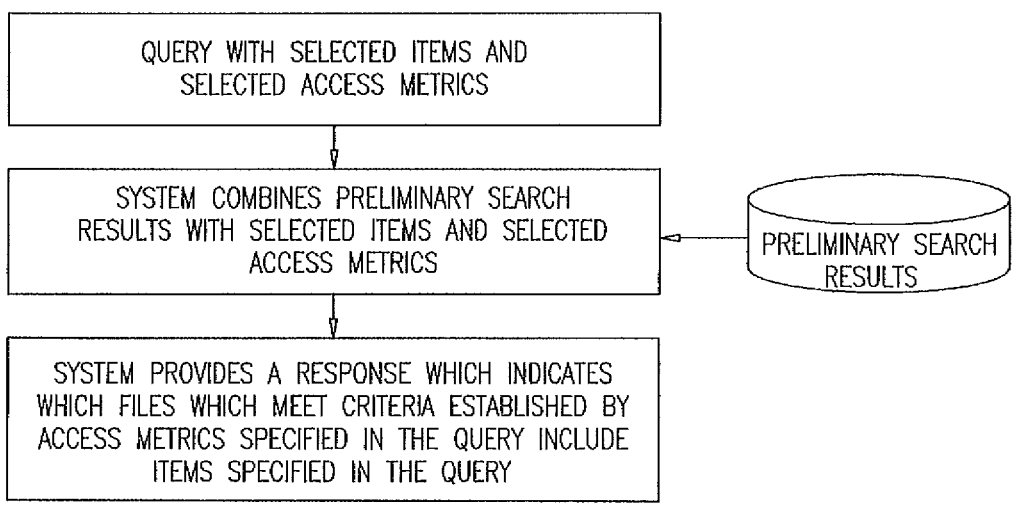
FIG. 5 is a simplified block diagram illustration of functionality for selecting data of interest from among a multiplicity of data elements by considering only data elements which are characterized by a given content characteristic and a given access metric thereof.

Reference is now made to FIG. 5, which is a simplified block diagram illustration of functionality for selecting data of interest from among a multiplicity of data elements by considering only data elements which are characterized by a given content characteristic and a given access metric thereof. The functionality of FIG. 5 takes place in response to a query which selects one or more items from among the specified items and one or more selected access metrics from among the access metrics used to define the field of search.

All of the files whose identification appear in the preliminary search results database are examined:

1. to ascertain which files include the selected items set forth in the query; and 2. to ascertain which files meet criteria established by the selected access metrics set forth in the query.

The foregoing two examinations may be conducted in any suitable order.

Files that both include the selected items set forth in the query and meet criteria established by the selected access metrics set forth in the query are reported in a response to the query.

It will be appreciated by persons skilled in the art that the present invention is not limited by what has been particularly shown and described hereinabove. Rather the scope of the present invention includes both combinations and sub combinations of the various features described hereinabove as well as modifications thereof which would occur to persons skilled in the art upon reading the foregoing description and which are not in the prior art.

The invention claimed is:

1. A network system comprising:
   one or more client computers connected to one or more servers in an enterprise via network;
   a background data characterizer, executed on a computer, to receive a query from a human operator via the network, wherein the query comprising at least one user data access permissions metric specified by said human operator and at least one content based data characteristic specified by said human operator, said user is different from said human operator and
   to responsive to said query received from said human operator being operative for:
   identifying a data subset for content based on said at least one user data access permissions metric specified by said human operator, of said data subset; and
   characterizing data of interest at least by said at least one content based data characteristic and according to said at least one user data access permissions metric specified by said human operator;
   near real time data matching functionality, executed by the computer, for selecting said data of interest by considering only data elements which have both said at least one content based data characteristic and said at least one user data access permissions metric from among multiplicity of data elements; and
   a search functionality, executed by the computer, for automatically redefining a field of search in accordance with said at least one data access permissions metric multiple times, wherein the multiplicity of data elements includes data element status monitoring functionality, noting the current status of data elements that have been modified, added or removed in accordance with changes in said at least one data access permissions metric, wherein said at least one data access permissions metric is a dynamic metric which changes over time during operation of the enterprise, wherein said near real time data matching functionality comprises a background field of search definition and an automatic field of search redefinition, wherein said selecting the data of interest by considering only data elements which have said at least one content characteristic and said at least one data access permissions metric from among said multiplicity of data elements includes:
   searching for data elements which have said at least one content characteristic;
   automatically redefining, by the computer, said field of search in accordance with said at least one data access permissions metric multiple times and searching within said field of search multiple times, wherein said at least one data access permissions metric is different at least some of said multiple times;
   identifying data elements from among said multiplicity of data elements in accordance with said at least one data access permissions metric, the data of interest from among a multiplicity of data elements being stored in said multiple platforms in said enterprise;
   combining results of said searching and said identifying data elements, wherein the results of said searching being ordered at least in accordance with at least one data access permissions metric related prioritization characteristic; and
   providing the ordered results to the client computer via the network.

2. The system according to claim 1, wherein said searching and said identifying are performed by separate entities.

3. A computer-implemented method for identifying data of interest from among a multiplicity of data elements residing on multiple platforms in an enterprise, the method comprising:
   a background data characterizer, executed on a computer, to receive a query from a human operator via a network, wherein the query comprising at least one user data access permissions metric specified by said human operator and at least one content based data characteristic specified by said human operator, said user is different from said human operator; and
   responsive to said query received from said human operator:
   identifying, by the computer, a data subset for content based on said at least one user data access permissions metric specified by said operator, of said data subset; and
   characterizing, by the background characterizer executed, by the computer, data of interest at least by said at least one content based data characteristic and according to said at least one user data access permissions metric specified by said human operator; and
   selecting, by near real time data matching functionality executed by the computer, the data of interest by considering only data elements which have both said at least one content based data characteristic and said at least one user data access permissions metric from among said multiplicity of data elements, said near real time data matching functionality comprising a background field of search definition and an automatic field of search redefinition and search functionality operative to automatically redefine said field of search in accordance with said at least one data access permissions metric multiple times, and said multiplicity of data elements including data element status monitoring functionality, noting the current status of data elements that have been modified, added or removed in accordance with changes in said at least one data access permissions metric, wherein said at least one data access permissions metric is a dynamic metric which changes over time during operation of the enterprise, and
   said selecting the data of interest by considering only data elements which have said at least one content characteristic thereof and said at least one data access permissions metric thereof from among said multiplicity of data elements including:
   searching, by the computer, for data elements which have said at least one content characteristic;
   automatically redefining, by the computer, the field of search in accordance with said at least one data access permissions metric multiple times and searching within the field of search multiple times, wherein said at least one data access permissions metric is different at least some of said multiple times;
   identifying, by the computer, data elements from among said multiplicity of data elements in accordance with said at least one data access permissions metric;
   combining, by the computer, results of said searching for data elements and said identifying data elements, wherein the results of said searching being ordered at least in accordance with said at least one data access permissions metric related prioritization characteristic; and providing the ordered results to a user computer via the network.

4. The method according to claim 3, wherein said selecting the data of interest by considering only data elements which have said at least one content characteristic and said at least one data access permissions metric from among said multiplicity of data elements includes: separately from said searching for data elements which have said at least one content characteristic.

5. The method according to claim 4, wherein said searching and said identifying are performed by separate entities.

* * * * *